Dec. 30, 1952  S. MAYNER  2,623,408
TURBINE TYPE HYDRAULIC TORQUE CONVERTER
Filed Nov. 29, 1947
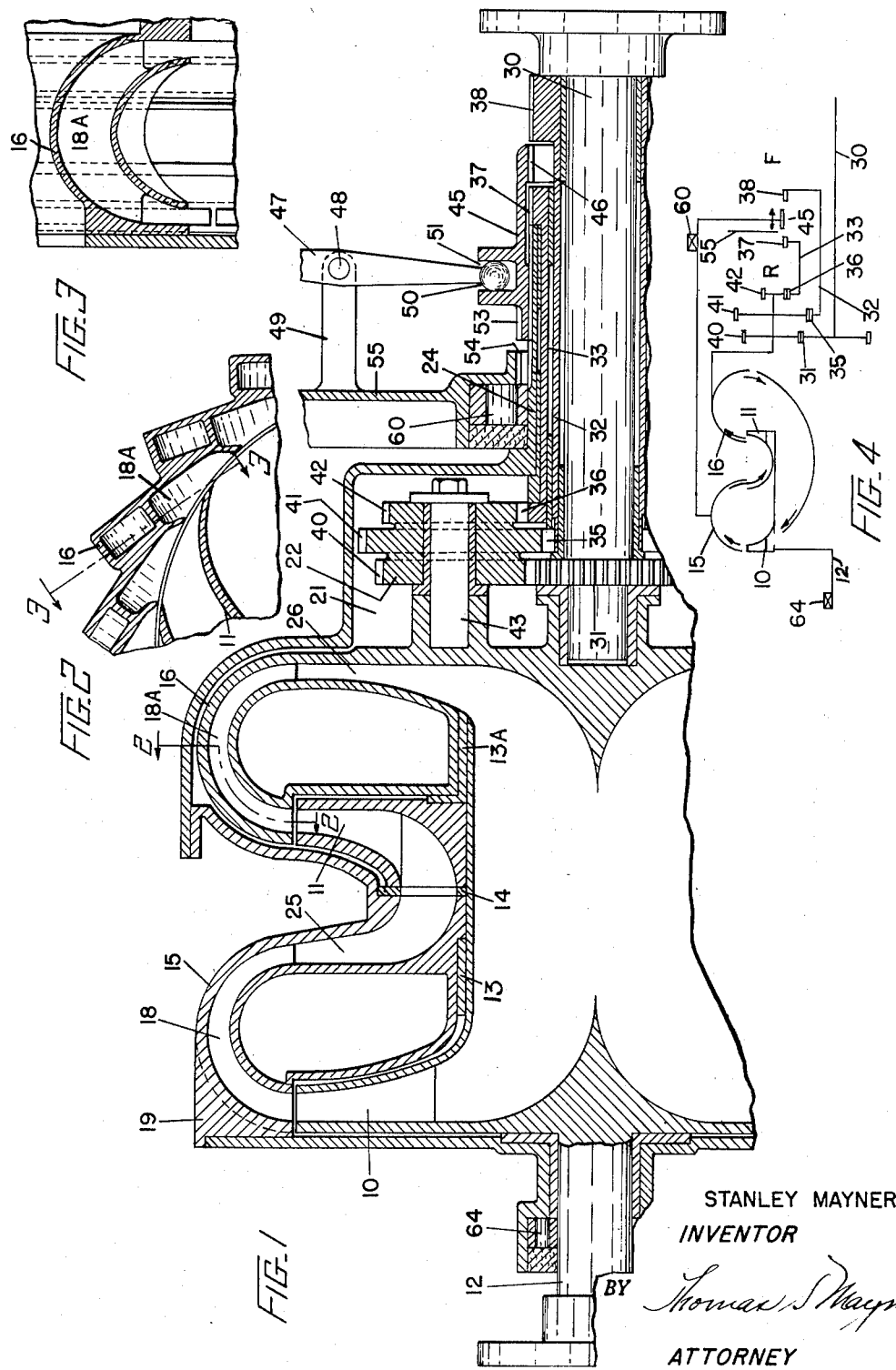
STANLEY MAYNER
INVENTOR
BY Thomas S. Mayner
ATTORNEY Patented Dec. 30, 1952

2,623,408

UNITED STATES PATENT OFFICE 2,623,408

TURBINE TYPE HYDRAULIC TORQUE CONVERTER

Stanley Mayner, Cleveland Heights, Ohio, assignor of two-fifths to Thomas S. Mayner, Russel Township, Ohio Application November 29, 1947, Serial No. 788,909

12 Claims. (Cl. 74—677)

This invention relates to a power transmitting apparatus and, more particularly, to a hydraulic power transmitting apparatus such as a turbine type torque converter adapted to be combined with gearing.

The torque converter of this invention advantageously provides for continuing high initial torques over a long torque ratio range, and for a continuous flow of uniform power. The torque converter is also adapted to provide for power output in either direction of the output shaft, in the same advantageous manner over substantially the same torque range.

Generally all torque converters have included in their fluid circuits a reaction member as an essential element. The converter of this invention omits such a member by, advantageously, a differential operation of its turbine members and an exterior means for holding one of the turbines from reverse rotation. The turbines utilized in the converter are advantageously of such a construction so as to absorb to an optimum degree substantially the full force of the fluid acting on them, the fluid energy being applied at a point farthest from the center of the converter and in substantially the direction of rotation of the turbines. Further, the converter construction is also such so as to effect a substantially undisturbed flow of the fluid through the elements comprising it.

High initial torques are derived from the converter by desirably increasing the initial head of the working fluid after it leaves an impeller to act on a first driven fluid reacting turbine member applying its force thereto then to be guided thereby to a second impeller where the head is increased. The increased head then acts on a second turbine member whose rotation is translated into high torque ratios. The head increase is effected by, advantageously, two fluid energizing members or impellers mounted for rotation in a parallel manner so that they act on the fluid in series, i. e. the first impeller creates an initial driving head which head with substantially no loss of energy is directed by the first turbine member to the second energizing member where it is increased. The head of the fluid thus built up acts on the second turbine member whose rotation is initially translated into torque output.

In the fluid circuit there are positioned, in an operative relation, at least one fluid reversing turbine member at the outlet of each energizing member, or fluid impeller. Each fluid reversing turbine member is adapted to rotate independently of the other, being subject only to the fluid heads of the fluid energizing members. Their rotation is differentially combined through gearing to drive an output shaft. The differential operation of the turbines enables one to initially rotate while the exterior holding means prevents the other turbine from reverse rotation and also causing it to act as a reacting member until it also can assume the load. The fluid reversing turbine members comprise an annular plurality of buckets or fluid receiving and reversing members positioned in angular planes substantially parallel to the common axis of rotation and desirably having their inlets and outlets facing inwardly into the interior of the converter. The turbine members are the subject of an application Serial No. 454,639 filed August 13, 1942 that has issued as Patent No. 2,432,115. By being reversing and when held stationary, the turbines are adapted to take the full fluid pressure and redirect or guide the fluid to a subsequent member, such as an impeller. Thus, when the first turbine member is held from substantial rotation by being loaded by the second turbine through the differential gearing the energizing fluid loses very little head while flowing through it to the second energizing member where the head is increased prior to its acting on the second turbine.

After the initial torque requirements are satisfied and the first turbine is released the second turbine and impeller become coupled; the first turbine then assumes the job of overcoming the remaining torque. Eventually the two turbines will rotate in union to form a completed coupling. As mentioned hereinbefore the turbine members, advantageously, are differentially interconnected through gearing. The gearing can, of course, be utilized to further modify the torque output of the turbine or driven members.

There is provided through the aforesaid arrangement of members a continuous elasticity in meeting desired torque ratios. The arrangement also enables the use of whatever energy there remains in the fluid upon leaving the second turbine to build up the initial head and thus ease the load on the primary energizing element.

The torque converter of this invention will be more specifically described in the following specification and accompanying drawing, where:

Figure 1 represents a cross section of the torque converter;

Figures 2 and 3 are partial sectional representations of the fluid reversing turbines utilized; and Figure 4 is a schematic diagram of the apparatus of Figure 1.

The torque converter of Figure 1 comprises two fluid energizing members 10 and 11 arranged to rotate with the power input shaft 12. The section of the shaft within the converter can be solid or it can be eliminated if so desired. The elimination of the shaft from the interior of the converter will provide for a substantially more uniform and unimpeded flow of the working fluid from the second turbine element of the converter to the energizing member 10 provided all entry points are properly curved and are clean and sharp. In view of the elimination of shafting from the interior of the converter the energizing member 11 is, then, advantageously mounted on a tubular shaft or sleeve 14 which forms a part of the guiding wall of the energizing member 10. The turbines 15 and 16 rotate about the tubular shaft 14 on sleeve-type bearings 13, 13A respectively.

There is operatively positioned a turbine element or driven member 15 adjacent the outlets of the energizing member 10. The driven member or turbine 15 comprises an annular series of fluid receiving and reversing buckets 18 superposed in a tangential manner to form a discontinuous, generally circular periphery. The structure and angularity of position of the fluid receiving and reversing turbine members 15, 16 is more specifically shown in Figures 2 and 3. As there shown the buckets or fluid passages 18, 18A are substantially fully reversing. They are positioned in a generally superposed manner to form the circumference of the turbine. The positioning plane of each bucket is substantially parallel to the axis of rotation of the turbine and the inlets and outlets of the buckets are in lines substantially parallel to the turbine axis.

Advantageously, such a turbine member construction will utilize to the fullest degree the fluid forces acting upon it, for the fluid is at the farthest radius possible and acting in the direction of rotation. The fluid is then redirected and the remaining forces, without appreciable further loss, are guided to a succeeding member. For example, with the unit under a load which is to be overcome the fluid energizing members 10 and 11 force the fluid through the turbines 15 and 16. The rotation of the turbines is then translated into torque output through differential gearing. Turbine 16 assumes the initial responsibility for overcoming the load and because of being differentially geared to turbine 15 it starts substantially immediately to rotate while turbine 15 is held from rotation. In a continuous and substantially undisturbed manner the fluid is forced through the first turbine, the fluid energy being utilized thereby to the fullest extent then it is redirected or guided with only such an energy loss as that absorbed by the turbine 10 and friction losses to the impeller 11 where the incoming head is increased to be directed into the second turbine 16. As the load is overcome the turbine 16 increases in speed and, the first turbine 15 starts to rotate. When the speed of turbine 16 approaches that of the impeller 11 the two members assume a coupling status. When turbine 16 and impeller 11 become coupled the first turbine then assumes the load, and upon overcoming it the turbine 15 and impeller 10 will also assume a coupling status placing the entire unit into a coupling as well as into a direct drive.

The fluid reversing turbine 15 is desirably, integrated into a torque converter housing 19 which is suitably sealed about the power input shaft 12. The housing 19 also forms the fluid flow path and encompasses the second fluid energizing member 11, and the second turbine element 16 which is constructed similarly to the turbine 15. The turbine 16 is also operatively positioned adjacent the fluid outlets of the second energizing member 11. The housing, additionally, encompasses a differential gearing compartment 21 in which are positioned a suitable number of planetary gear clusters 22. The housing 19 terminates in a sleeve 24 of which a substantial portion is splined. Because of the integrated turbine member 15 the housing is, of course, adapted to be rotated.

The outlet sections of the converter beyond the first turbine element 15 and beyond the secondary turbine element 16 are defined by two walls which form guiding paths 25, 26 for the working fluid. The guide path 25 is adapted to lead or guide without substantial disturbance and without impedance the flow of the fluid from the turbine 15 into the second energizing member 11; and the guiding path 26 is adapted to direct the flow of the working fluid back into the first energizing member 10.

Advantageously the impellers 10 and 11 are of the curved blade type. Whatever head or energy, then, that is left in the fluid when it leaves the second turbine 16 assists the first impeller in that it tends to increase the initial head. Furthermore the working fluid is better directed into the turbine buckets which are positioned at an angle in the direction of their rotation.

In the arrangement shown the secondary turbine 16 is adapted to rotate independently of the first turbine 15. The turbine revolves on suitable bearings about the sleeve 14 and about the stub section of the output shaft 30. The housing 19, thus, not only incorporates the turbine 15 but also, advantageously, encloses all of the other working parts of the converter and the differential gearing.

The energies of both turbines of the converter are transmitted to the output shaft 30 through a sun gear 31 mounted on the shaft. About the output shaft 30 and within the sleeve 24 there are rotatably positioned two sleeve members 32, 33. The sleeve members have mounted on them sun gears 35, 36 at one of their ends and splined sections 37, 38 at the other of their ends. Sun gear 31 and the sleeve mounted sun gears 35, 36 mesh with a corresponding number of complementary planet gears which are hereafter identified as being part of the planetary gear cluster 22. The gear cluster 22 is composed of gears 40, 41 and 42 which mesh with the shaft gear 31, the sleeve gear 35 and sleeve gear 36, respectively. The gear cluster is mounted on a stub shaft 43, which is suitably rotatably secured to the second turbine member 16. The gear cluster 22 is then adapted to rotate with the turbine 16, and the gears of the cluster are adapted to react against the sleeve mounted gears 35, 36 when held to cause a rotation of the output shaft 30.

Advantageously the sleeve mounted pinion or sun gears 35 and 36 are adapted to be selectively held to provide reaction for the complementary planet gears. A sleeve 45 is desirably splined on and can be moved laterally on the sleeve 24 to selectively mesh with the splined section 37 on the sleeve 33, or with the splined section 38 on the sleeve 32. Movement of the splined sleeve 45 can be manually effected by means of member 47 which is pivotally secured at some desirable point 48 to a stationary member 49. At one end of the member 47 there is a yoke 50 which rides in an annular groove 51 on the sleeve 45. There is further provided at one end of the sleeve 45 an external splined section 53 which is adapted to engage in meshing relation an internal spline 54 in the stationary member 55.

Within the stationary member 55 there is provided a one-direction brake 60. The brake 60 is also mounted about and secured to the sleeve 24 in order to prevent the turbine 15 and the housing 19 from rotation in an opposite direction. The brake serves to tie the sleeve 24 through splines 46 through the movement of splined sleeve 45 so that the splined section 46 engages the splined section 38 on the sleeve 32, the sleeve 38 on which is mounted the gear 35 is thus tied to the housing 19 to thereby provide reaction for cluster gear 41 enabling it to drive the sun gear in a forward direction. Otherwise, if the sleeve 24 were not held by the one-way brake 60 then the housing 19, that is, the turbine 15 would rotate in a reverse direction due to the reaction of the gear 41 which is driven by the initially responsive turbine 16. The brake 60 is thus adapted to hold sleeve 24 only until such time when turbine 15 starts to assume the load, then the sleeve 24 will rotate to drive gear 35.

For a forward motion of the output shaft 30 the yoke carrying sleeve 45 is moved into engagement with the rear spline 38 of the sleeve 32. Sleeve 32 carries the sun gear 35 which meshes with gear 41 of the gear cluster 22. Since the sleeve 24 is attached to the housing 19 and therethrough to the turbine 15 the turbine is kept from substantial initial rotation by the reactance of gear 35 on gear 41 because of a difference in gear diameters. The gear 41 as a result rotates about the sun gear 35 to drive the shaft 30 through its sun gear 31.

As the second turbine 16 increases in speed of rotation its reaction or loading on the sun gear 35 decreases thereby enabling an ever increasing rotation of the sleeve 24 and of the gear 35; thus, the turbine 15 assumes more and more of the load. The second turbine upon a substantial reduction of the torque requirements will approach the speed of the impeller 11 and thus merge into a coupling status. During this interval the first turbine 15 continues to assume more load until it takes over the entire load. The turbine 15, if uninterrupted because of load changes, will also approach a coupling stage and the differential placed upon the sun gear 31 because of the different speeds of rotation of the turbines disappears. When the aforesaid situation arises a substantially direct drive occurs.

Should there occur a further torque requirement turbine 15 will promptly undertake its solution if it can alone, otherwise, the torque would have to be redistributed between the two turbine members. Their rotation is immediately differentially translated to the output shaft. Further a very large torque range can be provided for by varying the size of the sun gear 35 and of its complementary planet gear 41. Advantageously, the planet gear 41 as shown in the drawing is greater in diameter than the sungear 35 driven by the first turbine 15 so that the second turbine can primarily meet the torque requirements.

Reversal of rotation of the output shaft is also provided. The change in direction of rotation is effected through gearing. The splined sleeve 45 is moved to effect the meshing of the external splines 53 which mesh with the internal splines 54 of the stationary member 55. Simultaneously the splines 46 of the sleeve 45 will mesh with the splines 37 of sleeve 33. The splined sleeve 45 thus will keep the sleeve 33 from rotation while sleeve 32 is released to move freely. Since sleeve 33 is held the planet gear 42 will rotate or turn about the sleeve mounted sun gear 36. Further, because of the gear size differences the motion of the planetary system will cause a change in the direction of the rotation of the output shaft 30.

The operation of the torque converter of this invention is also schematically shown. There is shown in Figure 4 the fluid flow path and the advantageous positioning of the various elements of the converter. A power input shaft 12 is adapted to drive two separate energizing members 10 and 11. Fluid leaving the energizing member 10 traverses the fluid receiving and reversing turbine 15 which is kept from rotation by the load or reaction on the unit. The turbine 15 because of its construction is of course urged to move forwardly and at the same time guides the fluid to the next impeller. The fluid while activating the first turbine flows on with its retained energy to the second impeller 11. The energy head of the fluid is further increased by the second energizing member 11, which may be said to be an energy booster, to act on the second turbine 16. With the increased high head acting on the turbine 16 which is advantageously geared high initial torque ratios are produced. The working fluid is further advantageously redirected by the structure of the second turbine 16 and the open wall construction of the converter into the first energizing member 10 to boost the initial head output of the working fluid by whatever energy head may still be in the fluid.

The second turbine 16 as shown has attached to it a planetary gear system containing gears 40, 41, 42. These gears rotate about sleeve mounted sun gears 31, 35, 36. Gear 31 drives the output shaft while gears 35 and 36 act as reaction gears for forward and reverse motion respectively. Gear 35 is adapted to be held by the splined sleeve 45 when the sleeve splines 38 mesh in the splines 46 since similarly, gear 36 is held by splined member 38 which is held by the splined sleeve member 45. Splined sleeve 45 is, of course, kept from rotation when it is in mesh with splines 54 of the stationary member 55.

When the rotative differential between the planetary gears 41 and the sun gear 35 approaches a certain value the second impeller 11 and turbine 16 will assume a coupling status and they will remain so for the interval that the first turbine takes over. When the load or reaction of the gear 41 on sun gear 35 is reduced so that the gear 35 assumes the driving load the brake 60 releases the sleeve 45 and the first turbine assumes the burden. Without further changes in load the first turbine and impeller also become coupled. When this condition comes about both turbines will rotate at substantially the same speeds, the first however primarily bearing the load, the gearing becoming locked in a straight forward transmission of the power of the primary mover. Such a situation will create a coupling of the torque converter.

Sometimes there will occur a greater rotation of the output shaft over the input shaft, for example, while a vehicle containing the converter is going down hill. It may be desirable under such a condition to utilize the action of the converter to slow down the vehicle to about the decreased rotation of the input power shaft. The turbine members 16 and 15 are adapted at such times to act as pumps for driving the working fluid against the energizing members which are positioned on the input shaft. Actually, the secondary turbine 16 will rotate, being driven by gears 35, 41 while the first turbine 15 will act as a fluid redirector, since advantageously the housing 19 becomes locked to the input shaft to prevent its reverse rotation. Upon a reversal of flow the housing 19 containing the turbine 15 will tend to float unless it is held to the input shaft 12. Thus held it becomes a reacting member for the reversed fluid which is redirected to the first impeller 10. The housing is held by some suitable device such as a one way clutch 64 positioned in front of the housing 19 about the input shaft 12. The housing 19 can be held to the input shaft 12 since brake 60 becomes ineffective and clutch 64 becomes effective. The turbine 16 in reversing the flow of the fluid drives it against the impeller 11 thence through the locked turbine 15 against the impeller 10 to thus effectively retard a vehicle employing the converter. Thus through such counteraction of the fluid on the energizing members the converter can be utilized as a braking device to slow down the motion of a vehicle.

Advantageously turbine 16 is geared higher than turbine 15 in order that it first assume the load on the converter. The gearing ratio between the two turbines can be as high as desired or it can be the same. In the latter instance both turbines would be under load substantially equally except for the fact that the head of the fluid on turbine 16 would be greater than on turbine 15 because of impeller 11. Where the turbine 16 is geared higher then, obviously, it requires less force to cause it to rotate. Also when it becomes coupled with the impeller 11 it is still under load because of being highly geared. Turbine 15, as a result, will fail to become coupled with its impeller until it overcomes the difference in the gear ratios between itself and turbine 16. The possibility, then, exists that a completed coupling may only rarely be had since there is always some inertia to be overcome. Although the drawing shows the turbines to be nearly equal in diameter so that substantially equal torques would actuate them, the relative diameters of turbines 15 and 16 can advantageously be varied, or their size to equalize the torques in the event of the turbines being differently geared. Thus, the diameter of turbine 15 can be increased to the extent of providing torque compensation for the difference in the turbine gear ratios. Since torque increases as the diameter to the fifth power it would require but a small extension of the diameter of a turbine to compensate for even a substantial gear ratio difference. The turbine 15, then, can have a slightly greater diameter than turbine 16 so that their torques are substantially equal even though being differentially geared, and the gears being of different diameters. By being equalized in the aforesaid manner the converter will, upon an equalization of torque on the turbines, become a full coupling.

In the drawing turbine 16 is shown as being more highly geared than turbine 15. The arrangement can be reversed, if desired, and the result would be substantially the same. Further additional stages in series can be added to the converter in the same manner as shown although the disclosure is limited to one embodiment.

I claim:

1. A fluid torque converter comprising a pair of fluid energizing members, a fluid driven turbine member positioned adjacent the fluid outlets of each of said fluid energizing members and between them, said turbines being of different sizes and being adapted to be individually driven, gears associated with said turbines for differentially interconnecting them and for transmitting their torques, said gears being of different diameters so that one of said turbines is adapted to rotate at a greater rate than the other of said turbines, and said lesser rate turbine being larger an extent to substantially compensate for torque differences between said turbines caused by the different gear diameters.

2. In a fluid torque converter, at least two individually driven turbine members, means for differentially interconnecting said turbine members comprising, a planetary gear set having at least two gears rotatably fixed to one of said turbine members, a sun gear in meshing relation with each of said planetary gears, an output shaft, one of said sun gears being mounted on said output shaft, and said other of said sun gears being operatively associated with the other of said turbine members.

3. In a fluid torque converter, at least two individually driven turbine members, means for differentially interconnecting said turbine members comprising, a planetary gearset fixed to one of said turbine members, an output shaft having a sun gear in meshing relation with one of the gears of said planetary gearset, a rotatably mounted sleeve member about said output shaft having a sun gear, said sun gear being in meshing relation with another of the gears of said planetary gearset, and means for drivingly connecting the other of said turbine members with said second sun gear of said rotatably sleeve mounted member.

4. In a fluid torque converter, at least two individually driven turbine members, means for drivingly interconnecting said turbine members, an output shaft, a planetary gearset having a plurality of gears fixed to one of said turbine members, a sun gear on said output shaft being in meshing relation with one set of gears of said gearset, a rotatably mounted sleeve about said output shaft having a sun gear, said sleeve mounted sun gear being in meshing relation with another set of planet gears of said gearset, means for drivingly connecting the other turbine with said sleeve mounted sun gear, means for holding said sleeve from opposite rotation, a second rotatably mounted sleeve having a sun gear, said sun gear on said second sleeve member being in meshing relation with another of said planetary gears of said set, and means for holding said second sleeve whereby the direction of the output shaft is reversed.

5. In a fluid torque converter, at least two individually driven turbine members, means for drivingly interconnecting said turbine members, a planetary gearset fixed to one of said turbine members, an output shaft, a sun gear on said output shaft in meshing relation with said gearset, a sleeve rotatably mounted about said output shaft having a sun gear, said sleeve mounted sun gear being in meshing relation with gears of said planetary gearset, means for drivingly connecting the other of said turbines with said sleeve, means associated with said sleeve for preventing the rotation of said latter turbine in a reverse direction, said sleeve mounted sun gear and its complement gear of said planetary set being of different diameters to thereby provide reaction for and permit prior rotation of the turbine with the gearset, said turbine rotation preventing means becoming inoperative upon a predetermined torque on said first turbine permitting a jointly differentially adjustable actuation of said output shaft, and a second rotatably mounted sleeve member having a sun gear, said sun gear being in meshing relation with said planetary gearset, and means for holding said second sleeve from rotation to thereby reverse the direction of rotation of said output shaft.

6. In a power transmitting apparatus, at least two fluid energizing members mounted on the same shaft and in the same fluid circuit, said energizing members having curved blades, independently rotating turbine members operatively positioned adjacent the fluid outlet portions of said energizing members and being actuated by the energized fluid, the fluid being primarily and additionally energized by said energizing members, said turbine members having a plurality of circumferentially positioned inwardly facing fluid receiving and reversing buckets positioned at acute fluid receiving angles, the inlets and outlets of said buckets being in lines substantially parallel to the axis of rotation of the turbines, and a curved path defined by the walls of the turbine members and of the energizing members for redirecting fluid into the curved blades of the energizing members.

7. A torque converter comprising, an input shaft having two spaced impellers, fluid receiving and reversing turbines positioned adjacent the fluid outlets of each of said impellers, said turbines being adapted to be individually driven relative to each other in the same direction, a planetary gear system having a rotatable planet gearset associated with one of said turbines and rotating therewith, a sun gear associated with the other of said turbines, a sun gear mounted on an output shaft, both said sun gears being in meshing relation with said planet gearset, and said gearset being rotated by the relative rotation of said turbines and being adapted to drive said output shaft mounted sun gear.

8. A power transmitting apparatus comprising, a fluid circuit, at least two fluid energizing members acting in series in said fluid circuit, said members energizing fluid in a radially outward direction to their axes of rotation, and individually driven turbine members positioned in said fluid circuit adjacent said fluid energizing members, each of said turbine members comprising a plurality of fluid direction changing passages having radially outwardly positioned inlets and radially inwardly positioned outlets with respect to the axes of said turbine members.

9. A power transmitting apparatus comprising, a fluid circuit, at least two fluid energizing members acting in series in said fluid circuit, said members energizing fluid in a radially outward direction to their axes of rotation, individual turbine members positioned in said fluid circuit adjacent said fluid energizing members, each of said turbine members comprising a plurality of fluid direction changing passages having radially outwardly positioned inlets and radially inwardly positioned outlets with respect to the axes of said turbine members, and means for guiding the fluid leaving said turbine members to said fluid energizing members.

10. In a power transmitting apparatus having a fluid circuit, at least two independently rotating rotors arranged in a series relation in said fluid circuit, and each of said rotors comprising a plurality of passages positioned in planes generally parallel to the axis of said rotors, said passages having inlets positioned in a radially outward direction and outlets positioned in a radially inward direction with respect to their axes of rotation.

11. A fluid power transmitting apparatus comprising a fluid circuit, at least two fluid energizing members acting in series and positioned in said fluid circuit, individually rotating turbine members rotating in the same direction when driven by the energized fluid, each of said turbine members being axially spaced and comprising a plurality of passages positioned in planes generally parallel to their axes of rotation, said passages having inlets positioned in a radially outward direction and outlets positioned in a radially inward direction with respect to their axes of rotation, and a portion of one of said turbine members and of one of said energizing members forming a fluid direction changing means between said turbine members.

12. A fluid power transmitting apparatus comprising a fluid circuit, at least two fluid energizing members acting in series and positioned in said fluid circuit, individually rotating turbine members rotating in the same direction when driven by the energizing fluid, each of said turbine members being axially spaced and comprising an annular plurality of passages positioned in planes generally parallel to the axes of rotation of said turbine members, said passages having inlets positioned in a radially outward direction and outlets positioned in a radially inward direction with respect to their axes of rotation, a portion of one of said turbine members and of one of said energizing members acting as a fluid direction changing means between said turbine members, and means for axially redirecting fluid from one of said turbine members through the core of said power transmitting apparatus to one of said fluid energizing members.

STANLEY MAYNER.

REFERENCES CITED

The following references are of record in the file of this patent:

UNITED STATES PATENTS

| Number | Name | Date |
|---|---|---|
| 1,855,967 | Jandasek | Apr. 26, 1932 |
| 1,993,741 | Jandasek | Mar. 12, 1935 |
| 2,055,895 | Fawcett | Sept. 29, 1936 |
| 2,416,948 | Pavlecka | Mar. 4, 1947 |

FOREIGN PATENTS

| Number | Country | Date |
|---|---|---|
| 442,363 | Great Britain | Feb. 3, 1936 |